United States Patent [19]
Benson

[11] Patent Number: 5,321,904
[45] Date of Patent: Jun. 21, 1994

[54] FISHING POLE HOLDER ASSEMBLY

[76] Inventor: Raymond E. Benson, 436 Uvedale Rd., Riverside, Ill. 60546

[21] Appl. No.: 997,202

[22] Filed: Dec. 28, 1992

[51] Int. Cl.⁵ .............................. A01K 97/10
[52] U.S. Cl. ................... 43/21.2; 248/223.4; 248/538; 211/70.8
[58] Field of Search .......... 43/21.2; 248/221.4, 248/223.4, 538, 518, 535; 211/70.8, 94, 65

[56] References Cited

U.S. PATENT DOCUMENTS

| | | | |
|---|---|---|---|
| 545,385 | 8/1895 | Simpson et al. | 248/538 |
| 565,001 | 8/1896 | Horton | 248/515 |
| 2,174,140 | 9/1939 | Schofield | 248/538 X |
| 3,000,599 | 9/1961 | Honig | 248/515 |
| 3,161,390 | 12/1964 | Larson | 248/514 |
| 3,543,432 | 12/1970 | Gates | 43/54.1 |
| 3,564,753 | 2/1971 | Fravel | 248/538 X |
| 3,659,369 | 5/1972 | Hermanson | 43/21.2 |
| 3,802,652 | 4/1974 | Holton | 248/534 |
| 3,870,259 | 3/1975 | Reynolds | 43/21.2 X |
| 3,964,706 | 6/1976 | Adams | 43/21.2 |
| 4,014,128 | 3/1977 | Hrdicka | 43/21.2 |
| 4,017,998 | 4/1977 | Dumler | 43/21.2 |
| 4,050,178 | 9/1977 | Bryan | 43/21.2 |
| 4,095,364 | 6/1978 | Prine | 43/21.2 |
| 4,157,803 | 6/1979 | Mack | 211/70.8 |
| 4,468,878 | 9/1984 | Maher | 43/21.2 |
| 4,495,721 | 1/1985 | Emory | 43/21.2 |
| 4,551,939 | 11/1985 | Kitchens | 43/21.2 |
| 4,841,660 | 6/1989 | James | 43/21.2 |
| 4,848,021 | 7/1989 | Simko | 43/21.2 |
| 4,852,291 | 8/1989 | Mengo | 43/21.2 |
| 4,932,152 | 6/1990 | Barlotta et al. | 43/21.2 |
| 4,961,505 | 10/1990 | Moeller | 211/70.8 |
| 5,014,458 | 5/1991 | Wagner | 43/21.2 |
| 5,065,540 | 11/1991 | Potter | 43/21.2 |
| 5,105,574 | 4/1992 | Fast | 43/21.2 |
| 5,187,892 | 2/1993 | Gutierrez | 43/21.2 |

*Primary Examiner*—Paula A. Bradley
*Assistant Examiner*—Jeanne M. Elpel
*Attorney, Agent, or Firm*—Dorn, McEachran, Jambor & Keating

[57] ABSTRACT

A fishing pole holder assembly consisting of a holder and a mounting bracket to receive the holder. The holder includes a hollow, rectangular member to receive the fishing pole, legs extending at an angle from one side of the hollow member, and locking inserts formed at the end of these legs. The locking inserts form an acute angle with the hollow member. The bracket which receives the holder may be mounted on any planar surface. The width of the bracket is sufficient to receive the combined width of the locking inserts. A vertical slot is formed in the bracket to receive the legs of the holder. Insertion of the legs and inserts into the bracket results in an interference fit between the holder and the bracket. A detent tip may be formed in the holder and a receiving aperture formed in the bracket to provide even greater locking engagement.

12 Claims, 2 Drawing Sheets

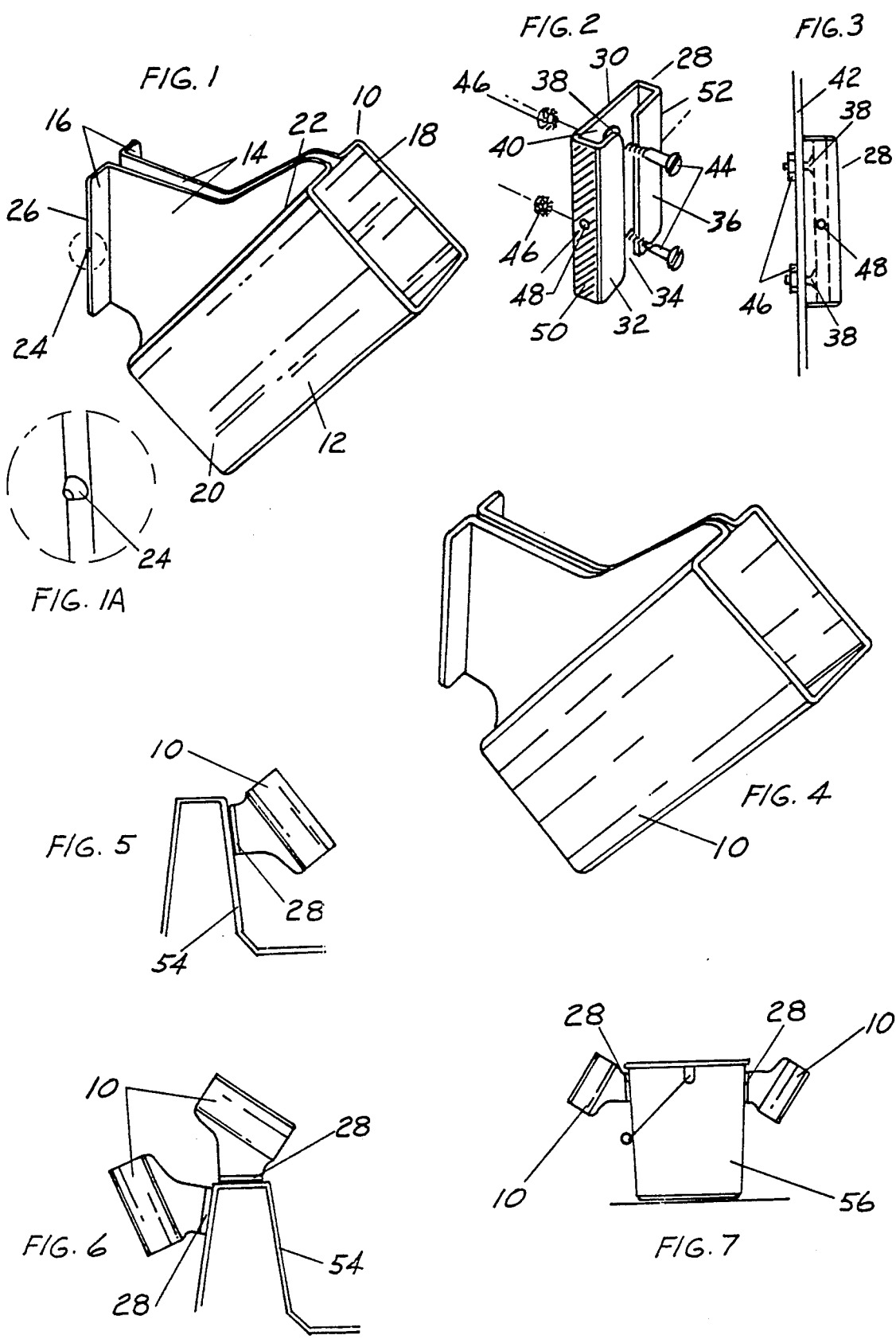

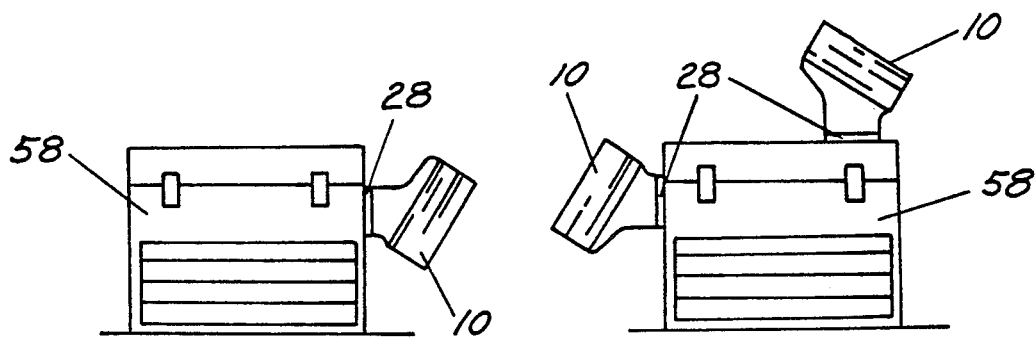
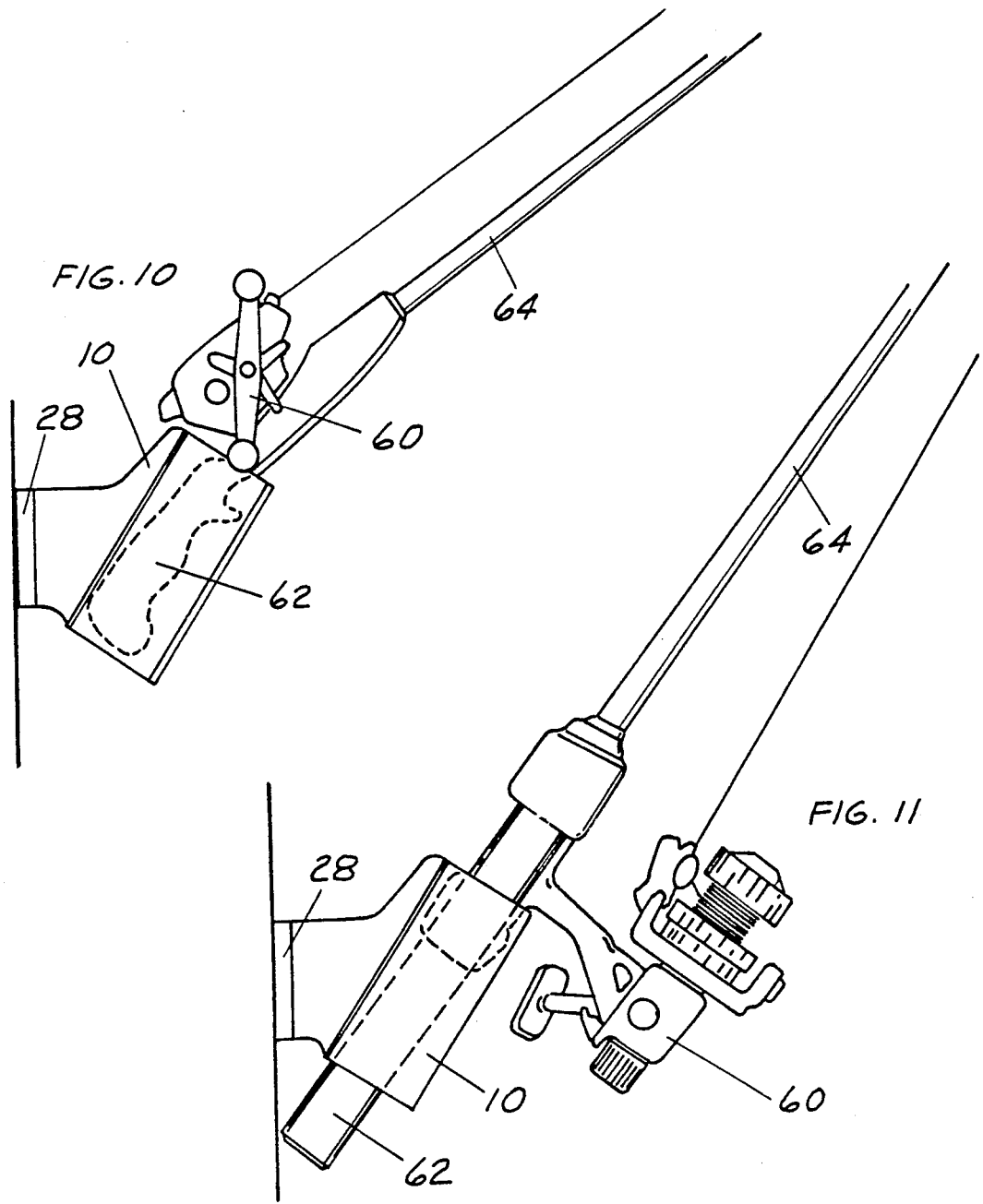

FISHING POLE HOLDER ASSEMBLY

BACKGROUND OF THE INVENTION

This invention relates to holder assemblies for fishing poles and other fishing-related accessories.

Rod holders have been provided for fishermen to relieve them of the burden of holding the pole throughout the entire time spent fishing. Problems encountered in designing such holders have been numerous. Most holders are limited in their use to one particular type of surface; i.e., a vertical surface, a horizontal surface, the side of a boat, the top of a tackle box, etc. It is desirable to have a holder versatile enough to be used on any type of surface. Holders are commonly limited by their shape to use with one type of rod or pole. It is desirable to have a holder which can hold any type of rod or pole. Another area in which many of the known holders are insufficient is that of convenience. Commonly, much effort is involved in installing or disassembling the holders. It is desirable to have a holder with easily detachable and interchangeable elements.

SUMMARY OF THE INVENTION

Accordingly, this invention endeavors to provide a fishing pole holder which overcomes all of the above described deficiencies. The primary objective is to provide a fishing pole holder assembly consisting of two easily installed and detachable elements that can be utilized on any type of surface and can hold any type of pole.

Another objective of this invention is to provide a fishing pole holder consisting of only a mounting base and a holder which are easily detachable from each other and are held together by a tight interference fit.

Another objective of this invention is to provide a holder assembly in which the holder may be used in conjuncion with brackets installed on any type of surface, simply by reversing the vertical orientation of the holder as needed.

Other objectives will be set forth in the ensuing specification.

BRIEF DESCRIPTION OF THE DRAWINGS

FIG. 1 is a perspective view of an uninstalled holder according to the invention;

FIG. 1A is an enlarged view of a portion of FIG. 1;

FIG. 2 is a perspective view of an uninstalled mounting bracket according to the invention;

FIG. 3 is a side view of the mounting bracket of FIG. 2 when installed;

FIG. 4 is a perspective view of the holder of FIG. 1 as it appears when installed in the bracket of FIGS. 2 & 3;

FIG. 5 is a side view of the holder assembly mounted on the inboard side of a boat;

FIG. 6 is a side view of one holder assembly mounted on the outboard side of a boat and another holder assembly mounted on the top portion of a boat hull;

FIG. 7 is a side view of two holder assemblies mounted on opposite sides of a bucket;

FIG. 8 is a side view of the holder assembly mounted on one side of a tackle box;

FIG. 9 is a side view of one holder assembly mounted on a side of a tackle box opposite to that shown in FIG. 8 and another holder assembly mounted on the top of the tackle box;

FIG. 10 is a side view of the holder assembly with a baitcast type rod mounted inside;

FIG. 11 is a side view of the holder assembly with a spincast type rod mounted inside;

DETAILED DESCRIPTION OF THE INVENTION

Holder 10 of the fishing pole holder assembly is illustrated in FIG. 1. Holder 10 is a one-piece unit, preferably molded out of a flexible material, such as plastic. Alternatively, the holder could be constructed of a metal, such as aluminum.

Holder 10 has essentially three elements: a rectangular member 12; two legs 14; and two locking inserts 16. Rectangular member 12 is hollow and open at its top end 18 as well as its bottom end 20, thus allowing the handle of a fishing pole to be passed entirely through the structure (see FIGS. 10 and 11).

Two legs 14 extend from side 22 of member 12 at a downward angle. When holder 10 is uninstalled, as in FIG. 1, legs 14 do not extend from member 12 in perfect parallel. Rather, a slight angle is formed between them. Two locking inserts 16 are formed at the end of legs 14. Inserts 16 are bent outwardly from legs 14 at approximately a right angle. An acute angle is formed between inserts 16 and side 22 of member 12 in the plane parallel to legs 14. Preferably, this angle should be in the vicinity of 30 to 32 degrees.

A detent tip 24 is formed in the middle of side wall 26 of one of the inserts 16. A tip 24 is formed on only one of the inserts 16; it is unimportant which insert is chosen.

FIG. 2 depicts mounting bracket 28. Bracket 28 is a one-piece, hollow rectangular structure. Like holder 10, bracket 28 may be formed of plastic or metal. Top end 30 and bottom end 32 are each open. A vertical slot 34 is formed in the front face 36 of bracket 28. Slot 34 extends the entire vertical length of face 36, from top end 30 and bottom end 32. The open top and bottom ends 30 and 32, together with slot 34, facilitate engagement with locking inserts 16 and legs 14 of holder 10.

Round apertures 38 are formed in the rear wall 40 of bracket 28. Apertures 38 should preferably be formed near the vertical midline of rear wall 40, with one near the top end 30 and one near the bottom end 32. Bracket 28 may be installed on a desired surface 42 by passing bolts or screws 44 through apertures 38 and surface 42 and then tightening nuts 46 on the end of screws or bolts 44. An installed bracket 28 is shown in FIG. 3. It should be realized that other methods known to those skilled in the art could be utilized in fastening bracket 28 to a surface 42. Round apertures 48 are formed in side walls 50 and 52 of bracket 28 Apertures 48 should be positioned to receive the detent tip 24 formed on one insert 16.

The inner width of bracket 28, from the inside of side wall 50 to the inside of side wall 52, should be approximately equal to the combined width of inserts 16 and detent tip 24. In the preferred embodiment, the inner width of bracket 28 also includes a small clearance space (approx. 0.125 inches) for inserts 16. The width of vertical slot 34 is at least as great as the combined width of legs 14.

Holder 10 is inserted into bracket 28 by first applying pressure sufficient to cause legs 14 to move together and be parallel to each other. The flexible nature of holder 10 makes this possible. Concurrently, inserts 16 come together, enabling the insertion of inserts 16 into either top end 30 or bottom end 32 of bracket 28. Legs 14 are received by slot 34. Holder 10 is then moved downwardly (or upwardly) through bracket 28 until aperture 48 receives detent tip 24, locking the holder into place. When pressure is no longer exerted on legs 14, their flexible nature will cause them to expand outward as much as possible within bracket 28, providing an interference fit in addition to the locking relationship between detent tip 24 and aperture 48. Thus, spring force exerted by legs 14, friction between bracket 28 and legs 14 and detent tip 24 all contribute to stabilizing holder 10 within bracket 28. Additionally, when a rod is placed in the holder, the downward torque exerted by the rod on the holder helps to keep the holder in place.

This simple assembly procedure may be carried out on virtually any surface where it is desired to hold a fishing pole in place. Common surfaces may include side walls or floors of boats, docks or piers, the sides or tops of a tackle box or the sides of a bucket. FIGS. 5-9 show how the holder assembly may be installed on such surfaces. FIG. 5 shows holder 10 and bracket 28 installed on the inboard side of a boat hull 54. The holder assembly can be easily utilized on the outboard side of the boat, as FIG. 6 demonstrates, simply by installing a bracket there and reversing the vertical orientation of holder 10. Also shown in FIG. 6 is an assembly installed on a horizontal surface of the boat hull.

FIG. 7 shows holder assemblies installed on two sides of a bucket 56. Again, it should be noted that the structure of holder 10 allows its use on either side of the bucket simply by reversing its vertical orientation. Finally, FIGS. 8 and 9 show various ways in which the holder assembly could be mounted on a tackle box 58.

The holder assembly is particularly useful where it is anticipated that it will be necessary to mount a fishing pole on various surfaces throughout the day. Brackets may be mounted wherever it will be desired to hold a pole. One holder may then be moved from bracket to bracket as desired swiftly and easily. The one-piece construction and interference fit allows a holder to be removed or installed with a simple hand motion. For example, a bracket could be mounted on each of the outboard, inboard and top surfaces of a boat hull (FIGS. 5 and 6). Holder locations could be quickly switched by pulling the holder out of one bracket and placing it into another.

A rectangular structure for member 12 is preferred as it allows any type of fishing pole to be held. FIG. 10 shows a rod of the baitcast type positioned within the assembly; FIG. 11 shows a rod of the spincast type positioned within the assembly. Although each has a differently shaped handle, each is successfully held by holder 10. FIGS. 10 and 11 also illustrate how a reel portion 60 of a fishing pole interacts with the rectangular upper surface of holder 10 to insure that only the handle portion 62 of the fishing pole is disposed within the holder. The rod portion 64 remains outside of the holder, at an acute angle to bracket 28. The flat, rectangular surfaces of holder 10 also provide a commercial advantage in that advertisements or promotions may easily be displayed on the holder. Of course, although a rectangular structure is preferred, other structures (tubular, triangular, etc.) could be utilized if desired.

I claim:

1. A fishing pole holder assembly comprising:
   a mounting bracket extending vertically between a first bracket end and a second bracket end, wherein said first bracket end is above said second bracket end and said second bracket end is below said first bracket end, said mounting bracket including means for attachment to a desired surface; and
   a holder detachably attached to said mounting bracket, said holder including an elongated hollow member spaced from said bracket and extending at an acute angle to said bracket between a first open holder end and a second open holder end, said holder further including legs extending from a side of said hollow member and having locking inserts formed at an angle perpendicular to said legs, said locking inserts being detachably received by said bracket,
   said first open holder end extending above said first bracket end and said second open holder end extending below said second bracket end, such that an elongated object passing through said hollow member and having ends extending beyond each end of said hollow member is unobstructed by said mounting bracket.

2. A fishing pole holder assembly as recited in claim 1, wherein said first and second open holder ends are positioned such that planes passing through said hollow member in a direction parallel to said side of said hollow member from which said legs extend will not intersect said mounting bracket.

3. A fishing pole holder assembly as recited in claim 1, wherein said elongated hollow member is rectangularly shaped.

4. A fishing pole holder assembly as recited in claim 1, wherein said legs project outward from said hollow member in a non-parallel orientation.

5. A fishing pole holder assembly comprising:
   a mounting bracket extending vertically between a first bracket end and a second bracket end, wherein said first bracket end is above said second bracket end and said second bracket end is below said first bracket end, said mounting bracket including means for attachment to a desired surface; and
   a holder detachably attached to said mounting bracket, said holder including an elongated hollow member spaced from said bracket and extending at an acute angle to said bracket between a first open holder end and a second open holder end, said holder further including legs extending from a side of said hollow member and having locking inserts detachably received by said bracket,
   said bracket defining an inner space having a width at least as great as the combined width of said locking inserts, and a vertical slot having a width at least as great as the combined width of said legs, said locking inserts being received by said inner space and said legs being received by said vertical slot,
   said first open holder end extending above said first bracket end and said second open holder end extending below said second bracket end, such that an elongated object passing through said hollow member and having ends extending beyond each end of said hollow member is unobstructed by said mounting bracket.

6. A fishing pole holder assembly as recited in claim 5, wherein said first and second open holder ends are positioned such that planes passing through said hollow member in a direction parallel to said side of said hollow member from which said legs extend will not intersect said mounting bracket.

7. A fishing pole holder assembly as recited in claim 5, wherein said elongated hollow member is rectangularly shaped.

8. A fishing pole holder assembly as recited in claim 5, wherein said legs project outward from said hollow member in a non-parallel orientation.

9. A fishing pole holder assembly comprising:
a mounting bracket extending vertically between a first bracket end and a second bracket end, wherein said first bracket end is above said second bracket end and said second bracket end is below said first bracket end, said mounting bracket including means for attachment to a desired surface; and
a holder detachably attached to said mounting bracket, said holder including an elongated hollow member spaced from said bracket and extending at an acute angle to said bracket between a first open holder end and a second open holder end, said holder further including legs extending from a side of said hollow member and having locking inserts detachably received by said bracket, a detent tip being formed on an outer periphery of said locking insert and an aperture being formed in an inner periphery of said bracket, said aperture receiving said detent tip to secure said holder to said bracket, said first open holder end extending above said first bracket end and said second open holder end extending below said second bracket end, such that an elongated object passing through said hollow member and having ends extending beyond each end of said hollow member is unobstructed by said mounting bracket.

10. A fishing pole holder assembly as recited in claim 9, wherein said first and second open holder ends are positioned such that planes passing through said hollow member in a direction parallel to said side of said hollow member from which said legs extend will not intersect said mounting bracket.

11. A fishing pole holder assembly as recited in claim 9, wherein said elongated hollow member is rectangularly shaped.

12. A fishing pole holder assembly as recited in claim 9, wherein said legs project outward from said hollow member in a non-parallel orientation.

* * * * *